United States Patent [19]

Leaderman et al.

[11] Patent Number: 5,741,582
[45] Date of Patent: Apr. 21, 1998

[54] BLACKOUT DRAPERY LINING WITH DUAL FABRIC SURFACES

[75] Inventors: Alexander J. Leaderman, Pikesville; Stanley B. Fradin, Owings Mills, both of Md.

[73] Assignee: Rockland Industries, Inc., Baltimore, Md.

[21] Appl. No.: 525,160

[22] Filed: Sep. 8, 1995

[51] Int. Cl.$^6$ ...................................................... B32B 7/12
[52] U.S. Cl. .................. 428/317.5; 428/317.9; 442/65; 442/131; 442/153; 442/154; 442/220; 442/224
[58] Field of Search ...................... 428/248, 252, 428/236, 317.5, 317.9; 442/65, 131, 153, 154, 220, 224

[56] References Cited

U.S. PATENT DOCUMENTS

| | | |
|---|---|---|
| 4,039,709 | 8/1977 | Newman . |
| 4,391,865 | 7/1983 | Constance . |
| 4,409,275 | 10/1983 | Samowich . |
| 4,608,298 | 8/1986 | Klaff . |
| 4,677,016 | 6/1987 | Ferziger et al. . |
| 4,830,897 | 5/1989 | Lichtenstein . |
| 5,132,163 | 7/1992 | Leaderman et al. . |
| 5,283,111 | 2/1994 | Schlecker . |
| 5,393,598 | 2/1995 | Schlecker . |
| 5,431,990 | 7/1995 | Haynes et al. . |

OTHER PUBLICATIONS

"What Makes Fusibles Stick?", Morton Gilbert, *Apparel Industry Magazine*, Jul. 1984.

*Primary Examiner*—Helen Lee
*Attorney, Agent, or Firm*—Burns, Doane, Swecker & Mathis, L.L.P.

[57] ABSTRACT

A blackout drapery lining including a first substrate of a textile material having an inner surface and an external surface, the external surface forming a first finished surface of the drapery lining. A first adhesive layer having an opaque pigment is adhered to the first substrate and covers the inner surface of the first substrate to provide a substantially light impermeable barrier for the drapery lining. The drapery lining also includes a second substrate of a textile material having an inner surface and an external surface, the inner surface of the second substrate being adhered to the first adhesive layer and the external surface of the second substrate forms a second finished surface of the drapery lining.

23 Claims, 3 Drawing Sheets

```
┌─────────────────────────────────────────────┐
│ APPLY FIRST LAYER OF WHITE OR LIGHT         │
│ PIGMENTED ACRYLIC FOAM TO INNER             │
│ SURFACE OF FIRST CLOTH SUBSTRATE            │
└─────────────────────────────────────────────┘
                     │
                     ▼
┌─────────────────────────────────────────────┐
│ APPLY SECOND LAYER OF BLACK OR DARK         │
│ PIGMENTED ACRYLIC FOAM TO INNER             │
│ SURFACE OF SECOND CLOTH SUBSTRATE           │
└─────────────────────────────────────────────┘
                     │
                     ▼
┌─────────────────────────────────────────────┐
│ ADHERE FIRST LAYER OF ACRYLIC FOAM          │
│ TO SECOND LAYER OF ACRYLIC FOAM             │
└─────────────────────────────────────────────┘
```

FIG. I

BLACKOUT DRAPERY LINING WITH DUAL FABRIC SURFACES

TECHNICAL FIELD

The present invention relates to a multi-layer blackout drapery lining, and more particularly, to a blackout drapery lining having an outer fabric surface on each side thereof.

BACKGROUND OF THE INVENTION

Conventional draperies are primarily designed for style and appearance, and are generally made from premium fabrics of various colors. While such fabrics may serve the purpose of creating a desired visual effect, and may provide a desired level of privacy, they are generally ineffective for preventing a substantial quantity of light penetration into a room from outside sources, and a corresponding illumination of the room to an undesired level.

Accordingly, complete elimination of undesired light is a desirable goal. To achieve this result, blackout draperies and blackout drapery linings are typically used by hotels and motels in order to ensure that guest rooms can be maintained substantially dark at all times of the day. Residential use of blackout draperies is also desirable for those living in densely populated urban or suburban areas where the amount of light penetration into a bedroom at night may be considerable due to sources such as street lights, light from adjacent buildings and automobile headlights. Blackout draperies or drapery linings are generally made of a woven textile substrate, or of inexpensive non-woven substrates. The substrate is also coated with one or more layers of an acrylic latex based compound or foam, treated with resins such as water repellent, with an adhesive compound, or with fire-retardant materials, or with selected combinations. If the drapery or lining is to be used to blackout a room, at least one opaque layer is applied to the substrate. The opaque layer may be created by mixing an acrylic with a black pigment such as carbon black to provide the blackout effect. The blackout coating is applied over one surface of the textile substrate. Thus, the typical blackout drapery liner includes a textile substrate on one outer surface and the layer(s) of acrylic foam on the other outer surface.

The typical prior art blackout drapery liner described above sufficiently prevents the penetration of external light; however, the exposure of the acrylic foam layers on the external surface thereof does not produce a durable and long-wearing product. The foam layers over time tend to abrade and may delaminate after repeated washing and/or dry cleaning. So called "pin holes" may also form in the liner due to a defect in the processing caused by small air bubbles in the acrylic foam layer. These air bubbles tend to rupture during manufacturing, causing "pin holes" to form in the liner, and thereby causing a degradation of the blackout effect. The external light penetrates the pin holes in the liner and creates a "sparkling" effect into the room itself or onto the opposed face of the drapery material. It is therefore desired to overcome the deficiencies of abrasion and degraded blackout effect generally encountered in the use of prior art blackout drapery liners.

SUMMARY OF THE INVENTION

The present invention overcomes the disadvantages of the prior art by providing a blackout drapery lining having a material or cloth fabric on both external surfaces thereof. Thus, instead of the exposed foam, a material fabric is exposed on both sides of the drapery lining. The material fabric is more durable than the foam surface, resists abrasion, and may be imprinted, dyed or decorated to thereby serve as a self-lined drapery fabric.

In a preferred embodiment the blackout drapery lining includes a first substrate of a cloth material having an inner surface and an external surface, with the external surface forming a first finished surface of the drapery lining, a first adhesive layer having an opaque pigment adhered to the first substrate and covering the inner surface of the first substrate to provide a substantially light impermeable barrier for the drapery lining, and a second substrate of a cloth material having an inner surface and an external surface, the inner surface of the second substrate being adhered to the first adhesive layer and the external surface of the second substrate forming a second finished surface of the drapery lining. The adhesive layer is preferably an acrylic foam and the first and second substrates are preferably a polyester-cotton blend.

In a further embodiment of the invention, a second adhesive layer is applied between the first adhesive layer and one of the cloth substrates, the second adhesive layer having a white or colored pigment. Further, in yet another embodiment of the invention, a third adhesive layer is applied between the first adhesive layer and the other cloth substrate, the third adhesive layer also having a white or colored pigment. In both variations, the second and third adhesive layers are preferably an acrylic foam.

BRIEF DESCRIPTION OF THE DRAWINGS

The above description and other objects, advantages and features of the present invention will be more fully understood and appreciated by reference to the specification and accompanying drawings, wherein:

FIG. 1 is a flow diagram of the process of fabricating a blackout drapery lining with dual-sided fabric surfaces in accordance with a preferred embodiment of the present invention;

DETAILED DESCRIPTION OF THE PREFERRED EMBODIMENTS

Figure 2:
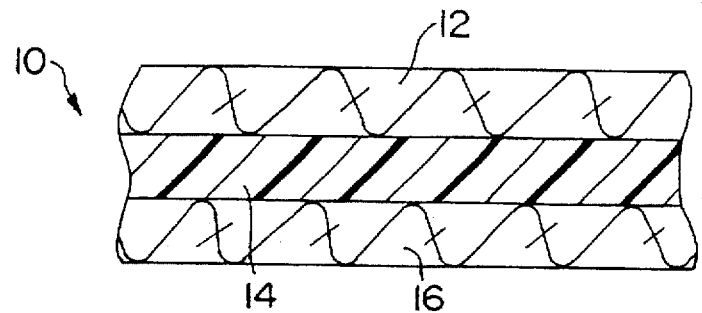
FIG. 2 is a schematic cross section of a blackout drapery lining in accordance with a preferred embodiment of the present invention.

Referring to FIG. 2, a first preferred embodiment of a blackout drapery lining in accordance with the present invention is shown generally by reference numeral 10. As shown, a first adhesive layer 14 is disposed between a first material substrate 12 and a second material substrate 16. The first and second material substrates 12 and 16 are preferably a woven polyester-cotton blend, but any suitable woven or non-woven textile composed of a fiber such as cotton, polyester, natural or man-made fiber, decorative fabrics, or any combination thereof may also be used. The first substrate 12 and the second substrate 16 may also be the same fiber or different fibers.

First adhesive layer 14 is preferably an acrylic polymer, such as for example an acrylic latex compound containing a foaming agent to facilitate coating. The acrylic foam may include a fire retardant compound such as a halogen-antimony compound to improve the fire retardant characteristics of drapery lining 10. The acrylic foam also may provide insulating characteristics for the drapery lining to thereby assist in maintaining the desired temperature within the room. The acrylic foam of first adhesive layer 14 also preferably includes a black or dark pigment, such as carbon black, which creates an opaque and substantially light impermeable barrier for drapery lining 10. The acrylic foam is applied to the first or second substrate using a conventional knife-overtable or knife-over-roll process, as discussed further below. First adhesive layer 14 may also be formed from polyurethane, polyurethane-acrylic blends, urethanes, urethane-acrylic blends or any other suitable adhesive compound which will adhere to the substrate and bond together the layers of the drapery.

Figure 3:
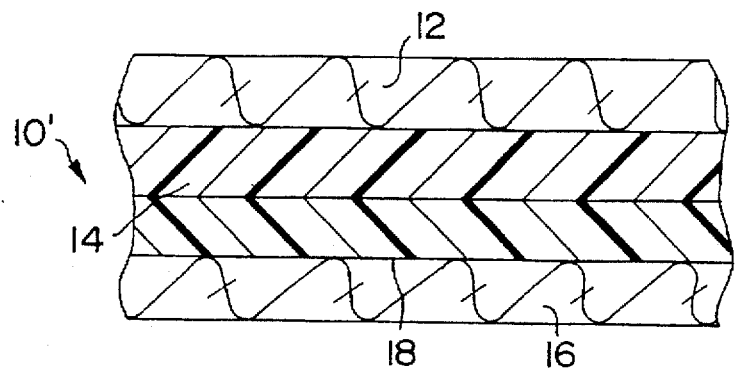
FIG. 3 is a schematic cross section of a blackout drapery lining in accordance with a second preferred embodiment of the present invention.

Referring to FIG. 3, a further preferred embodiment of blackout drapery lining of the present invention is shown generally by reference numeral 10'. In this embodiment, an additional second adhesive layer 18 is disposed between first substrate 12 and second substrate 16. Thus, the layers of drapery lining 10' are defined by first substrate 12, first adhesive layer 14 containing a dark or black pigment, second adhesive layer 18, and second substrate 16. Second adhesive layer 18 preferably includes a white pigment, such as titanium dioxide, or other colored pigment. The white second adhesive layer 18 is adhered to the black first adhesive layer 14 in order to reduce the visibility of the black layer beneath one of the substrates. Alternatively, a colored pigment may be used to provide a decorative background beneath the substrate. In both instances, the addition of second adhesive layer 18 improves the appearance of the drapery 10' while still providing a substantially light impermeable blackout drapery.

Figure 5:
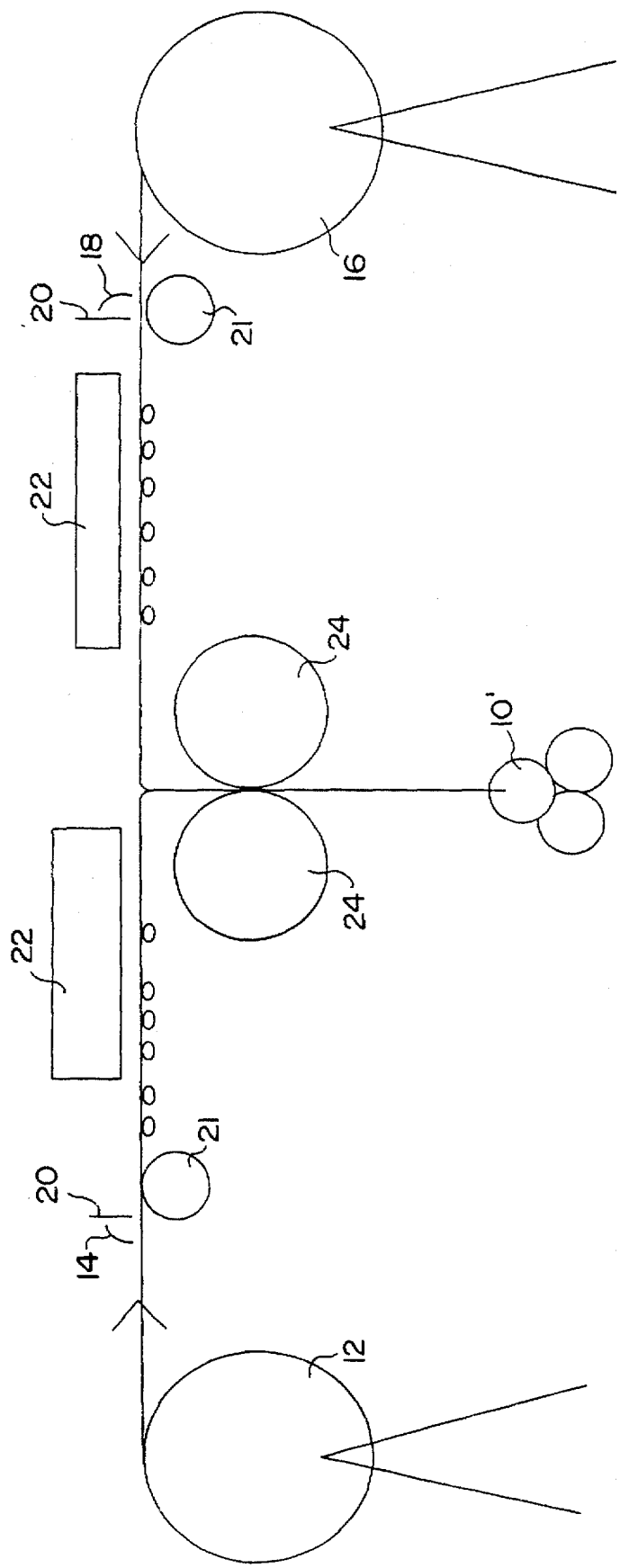
FIG. 5 is a schematic illustration of the process utilized in the manufacturer of a blackout drapery lining of the present invention.

The process for manufacturing drapery lining 10' is schematically shown in FIG. 5. The foam coating may be applied to the substrate by successively coating the substrate with discrete layers of the acrylic foam. The foam coated layers are then individually dried on the surface of the substrate to produce a strongly adherent foam layer, and the adherent foam layers may then be crushed and cured in a heat curing step. More particularly, second adhesive layer 18 is applied to second substrate 16 and first adhesive layer 14 is applied to first substrate 12 by using conventional knife-over-table or knife-over-roll machinery 20, 21 and the process therefor. After application of the adhesive acrylic foam layers to the substrates, the wet foam is dried by gas or electric dryers 22. The second substrate 16 including the second adhesive layer 18 and the first substrate 12 including the first adhesive layer 14 are then positioned such that the first adhesive layer 14 is adjacent the second adhesive layer 18. The substrates 12 and 16 are then passed through a pair of horizontal rolls 24 which may or may not be heated in order to compress air bubbles, crush the foam to reduce the cell size and aid in cross-linking the adhesive layers of foam to firmly adhere with one another as well as with the first and second substrates. A separate heat curing step may also be used depending on the nature of the adhesive layers. This produces drapery 10' having a flat and uniform foam layer between the outer fabric substrates.

Figure 4:
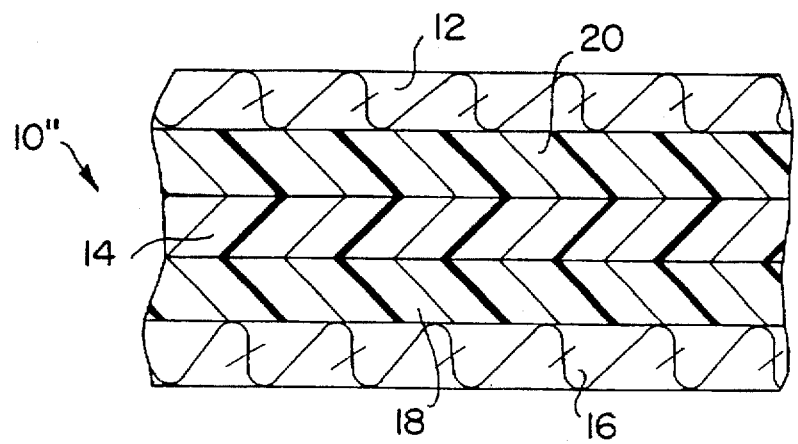
FIG. 4 is a schematic cross section of a blackout drapery lining in accordance with a third preferred embodiment of the present invention.

A third preferred embodiment of the present invention is shown in FIG. 4 and designated generally by reference numeral 10". Blackout drapery lining 10" includes first substrate 12, first adhesive layer 14 containing a dark pigment, second adhesive layer 18 containing a white or colored pigment, a further third adhesive layer 20 containing a white or colored pigment, and second substrate 16. Thus, second and third adhesive layers 18, 20 are disposed on each side of first adhesive layer 14 thereby placing a white or colored layer of acrylic foam on each side of the black layer of acrylic foam. By placing a white layer over each side of the black layer, there is further assurance that the blackout layer of the drapery will not show through the material substrate and detract from the appearance of the drapery.

The finished blackout drapery lining of the present invention provides a fabric substrate on both sides thereof and a product having superior drapeability, durability and blackout characteristics. The adherence of a fabric substrate directly to the acrylic foam layers on each outer surface of the drapery lining provides an extremely durable and abrasion resistant product. The present invention drapery lining thereby withstands repeated washing or dry cleaning far superior to the blackout drapery liners of the past. The blackout drapery lining of the present invention is also capable of being used by itself as a self-lined drapery and the first and second substrates may be applied with decorative patterns or colors printed or dyed thereon.

The blackout drapery lining of the present invention has been described in reference to the preferred embodiments having one, two, or three adhesive layers disposed between outer fabric substrates. It will be obvious to one skilled in the art that any number of additional layers of acrylic foam may be disposed between the fabric substrates. Additional layers of compounds providing flame resistance, additional insulation, reflectivity or the like may also be provided so long as both fabric substrates are adhered directly to adhesive layers and there is at least one adhesive layer having a black pigment to provide a substantially light impermeable barrier to the drapery lining. It will be obvious to one of ordinary skill in the art that numerous modifications may be made without departing from the true spirit and scope of the present invention, which is to be limited only by the appended claims.

We claim:

1. A blackout drapery lining comprising:

a first substrate of a textile material having an inner surface and an external surface, said external surface forming a first finished surface of said drapery lining;

a first adhesive layer having an opaque pigment adhered to said first substrate and coveting said inner surface of said first substrate to provide a substantially light impermeable barrier for said drapery lining; and a second substrate of a textile material having an inner surface and an external surface, said inner surface of said second substrate being adhered to said first adhesive layer and said external surface of said second substrate forming a second finished surface of said drapery lining.

2. The blackout drapery lining of claim 1 wherein said first adhesive layer includes a layer of acrylic foam.

3. The blackout drapery lining of claim 1 wherein said first adhesive layer comprises a layer selected from the group consisting of acrylic, acrylic foams, urethanes, and blends thereof.

4. The blackout drapery lining of claim 1 wherein said first and second substrates include a woven polyester-cotton blend.

5. The blackout drapery lining of claim 1 wherein said first substrate is selected from the group consisting of woven polyester, woven cotton, non-woven polyester, non-woven cotton, and blends thereof.

6. A blackout drapery lining comprising:
- a first substrate of a textile material having an inner surface and an external surface, said external surface forming a first finished surface of said drapery lining;
- a first adhesive layer having an opaque pigment adhered to said first substrate and covering said inner surface of said first substrate to provide a substantially light impermeable barrier for said drapery lining;
- a second adhesive layer adhered to said first adhesive layer; and
- a second substrate of a textile material having an inner surface and an external surface, said inner surface of said second substrate being adhered to said second adhesive layer and said external surface of said second substrate forming a second finished surface of said drapery lining.

7. The blackout drapery lining of claim 6 wherein said first adhesive layer includes a layer of acrylic foam.

8. The blackout drapery lining of claim 7 wherein said second adhesive layer includes a layer of acrylic foam having a white pigment.

9. The blackout drapery lining of claim 6 wherein said first adhesive layer comprises a layer selected from the group consisting of acrylic, acrylic foams, urethanes, and blends thereof.

10. The blackout drapery lining of claim 6 wherein said first and second substrates include a woven polyester-cotton blend.

11. The blackout drapery lining of claim 6 wherein said first and second substrates are selected from the group consisting of woven polyester, woven cotton, non-woven polyester, non-woven cotton, and blends thereof.

12. A blackout drapery lining comprising:
- a first substrate of a textile material having an inner surface and an external surface, said external surface forming a first finished surface of said drapery lining;
- a first adhesive layer adhered to said first substrate and covering said inner surface of said first substrate;
- a second adhesive layer having an opaque pigment adhered to said first acrylic foam layer to provide a substantially light impermeable barrier for said drapery lining;
- a third adhesive layer adhered to said second adhesive layer; and
- a second substrate of a textile material having an inner surface and an external surface, said inner surface of said second substrate being adhered to said third adhesive layer and said external surface of said second substrate forming a second finished surface of said drapery lining.

13. The blackout drapery lining of claim 12 wherein said first adhesive layer includes an acrylic foam having a white pigment.

14. The blackout drapery lining of claim 13 wherein said second adhesive layer includes an acrylic foam.

15. The blackout drapery lining of claim 14 wherein said third adhesive layer includes an acrylic foam having a white pigment.

16. The blackout drapery lining of claim 12 wherein said first adhesive layer comprises a layer selected from the group consisting of acrylic, acrylic foams, urethanes, and blends thereof.

17. The blackout drapery lining of claim 12 wherein said first and second substrates include a woven polyester-cotton blend.

18. The blackout drapery lining of claim 1 wherein at least said first substrate is selected from the group consisting of woven polyester, woven cotton, non-woven polyester, non-woven cotton, and blends thereof.

19. A blackout drapery lining comprising:
- a first substrate of a textile material having an inner surface and an external surface, said external surface forming a first finished surface of said drapery lining;
- at least one adhesive layer having an opaque pigment and providing a substantially light impermeable barrier for said drapery lining; and
- a second substrate of a textile material having an inner surface and an external surface, said external surface of said second substrate forming a second finished surface of said drapery lining;
- wherein said at least one adhesive layer is adhered between said inner surface of said first substrate of textile material and said inner surface of second substrate of textile material.

20. The blackout drapery lining of claim 19 wherein said at least one adhesive layer comprises an acrylic foam.

21. The blackout drapery lining of claim 19 further comprising a second adhesive layer disposed between said first adhesive layer and one of said first and second substrates of textile material.

22. The blackout drapery lining of claim 21 further comprising a third adhesive layer disposed between said first adhesive layer and one of said first and second substrates of textile material.

23. The blackout drapery lining of claim 21 wherein said second adhesive layer comprises an acrylic foam.

* * * * *